(12) United States Patent
Rumack (10) Patent No.: US 7,641,283 B2
(45) Date of Patent: Jan. 5, 2010

(54) INFANT POSITIONING SEAT INSERT

(76) Inventor: Beth G Rumack, 5317 N. 32nd Pl., Phoenix, AZ (US) 85018

( * ) Notice: Subject to any disclaimer, the term of this patent is extended or adjusted under 35 U.S.C. 154(b) by 0 days.

(21) Appl. No.: 12/077,990

(22) Filed: Mar. 24, 2008

(65) Prior Publication Data

US 2008/0231097 A1    Sep. 25, 2008

Related U.S. Application Data

(60) Provisional application No. 60/896,444, filed on Mar. 22, 2007.

(51) Int. Cl.
*A47C 7/46*    (2006.01)

(52) U.S. Cl. ............... 297/219.12; 297/230.13; 297/284.7

(58) Field of Classification Search ............ 297/219.12, 297/230.13, 250.1, 284.7, 464, 467
See application file for complete search history.

(56) References Cited

U.S. PATENT DOCUMENTS

| | | | | |
|---|---|---|---|---|
| 514,189 | A * | 2/1894 | Harvey | 297/230.14 |
| 1,001,312 | A * | 8/1911 | Sebring | 297/284.7 |
| 4,161,337 | A * | 7/1979 | Ross et al. | 297/230.12 |
| 4,502,728 | A * | 3/1985 | Sheldon et al. | 297/284.7 |
| 4,730,871 | A * | 3/1988 | Sheldon | 297/284.7 |
| 5,829,829 | A * | 11/1998 | Celestina-Krevh | 297/219.12 |
| 6,467,840 | B1 | 10/2002 | Verbovszky et al. | |
| 6,929,325 | B1 * | 8/2005 | Goelo | 297/219.1 |
| 6,957,861 | B1 * | 10/2005 | Chou et al. | 297/284.7 |
| 7,311,357 | B2 | 12/2007 | Gold et al. | |
| 2002/0014793 | A1 * | 2/2002 | Santha | 297/219.12 |
| 2007/0096523 | A1 * | 5/2007 | Greene, Jr. | 297/284.7 |

* cited by examiner

*Primary Examiner*—Peter R. Brown
(74) *Attorney, Agent, or Firm*—Tiffany & Bosco, P.A.

(57) ABSTRACT

An insert for protecting the breathing airway of an infant conforms to the incline angle of an infant seat, such as a car seat, high chair, stroller, or jogger. Preferably the insert is hinged so it can be used in an infant seat or laid flat for use on a changing table or other flat surface. In use, two side rolls contact the infant to prevent it from moving sideways. A bottom roll prevents slouching in the seat and supports the infant's legs when laid flat. Preferably, the bottom roll is removable so the insert may be used with larger infants who do not need the provided support. An adjustable shoulder roll extends between the side rolls and can be moved up or down for proper placement behind the infant's shoulders. The shoulder roll compensates for the infant's rearward-elongated head, keeping it in a natural position to avoid compromising the airway. The rolls are preferably made of memory foam and covered by machine-washable fabric.

18 Claims, 9 Drawing Sheets

INFANT POSITIONING SEAT INSERT

CROSS-REFERENCE TO RELATED APPLICATIONS

This application claims the benefit of co-pending provisional application No. 60/896,444 filed Mar. 22, 2007.

FIELD OF INVENTION

This invention relates to infant safety devices. This invention relates particularly to an insert to support an infant in a position that provides a clear airway and prevents compromise of that airway.

BACKGROUND

Compared to an adult human, an infant's parietal and occipital bones are disproportionate to the rest of the skull, resulting in an enlarged back of the head. When laid flat or positioned in a seat, the back of the infant's head contacts a surface in advance of its shoulders. The infant's head is pushed forward and downward, allowing the infant's pencil-sized airway to be easily compromised, putting the infant at risk for suffocation, apnea, oxygen desaturation episodes, bradycardia, and other dangerous conditions resulting from restricted breathing.

Parents use car seats to protect their infants in the event of a car accident. The angle of a car seat is specifically designed for crash safety to minimize the impact on the infant. The angle needed to maintain the safety of a regular-sized infant in a car accident places preterm and term infants at risk for airway compromise. Further, infants tend to slouch in car seats due to excessive room between the infant's crotch and center car seat strap, potentially causing airway compromise. Excess room on the sides of the infant allows shifting of the head, body, or both, sideways in the seat, which also may restrict the airway.

If the parents recognize the danger to the infant, they may attempt to pad the excess room using blankets, towels, or other space-fillers in order to keep the infant in place in the seat. This makeshift solution is potentially dangerous: the parents cannot be sure they are creating a safe environment for the infant and may be compromising the safety features of the car seat. Several patented solutions address the empty space in the seat, but do not resolve the airway restriction caused by the infant's enlarged head. A device that fills the dangerous empty space, supports the infant's head in a natural position, adjusts to the size of the infant, and does not affect the safety features of the infant seat is needed.

Therefore, it is an object of this invention to provide an infant seat insert that can be used in standard infant seats to prevent an infant's airway from becoming compromised. It is a further object that the insert be adjustable to accommodate any size infant. It is a further object that the insert not affect the safety features of the infant seat.

SUMMARY OF THE INVENTION

An infant seat insert positions an infant in an infant seat so that the infant's airway is not compromised. Two side rolls and a base roll fill the excess space in the seat, keeping the infant from slouching or shifting sideways. An adjustable shoulder roll rests behind the infant's shoulders to prevent the infant's head from driving its chin toward its chest and restricting the airway. The rolls are attached to a U-shaped frame which maintains the shape of the insert. The frame may be bent to provide adjustment of the resting angle of the insert. A support bar may attach to the frame near where the frame is bent and extend between the side rolls to help maintain the shape of the insert. The insert can be used in car seats, strollers, joggers, infant swings, and other seats having varying degrees of incline, and may also be used in a flat position, such as on a changing table.

DETAILED DESCRIPTION OF THE INVENTION

Figure 1:
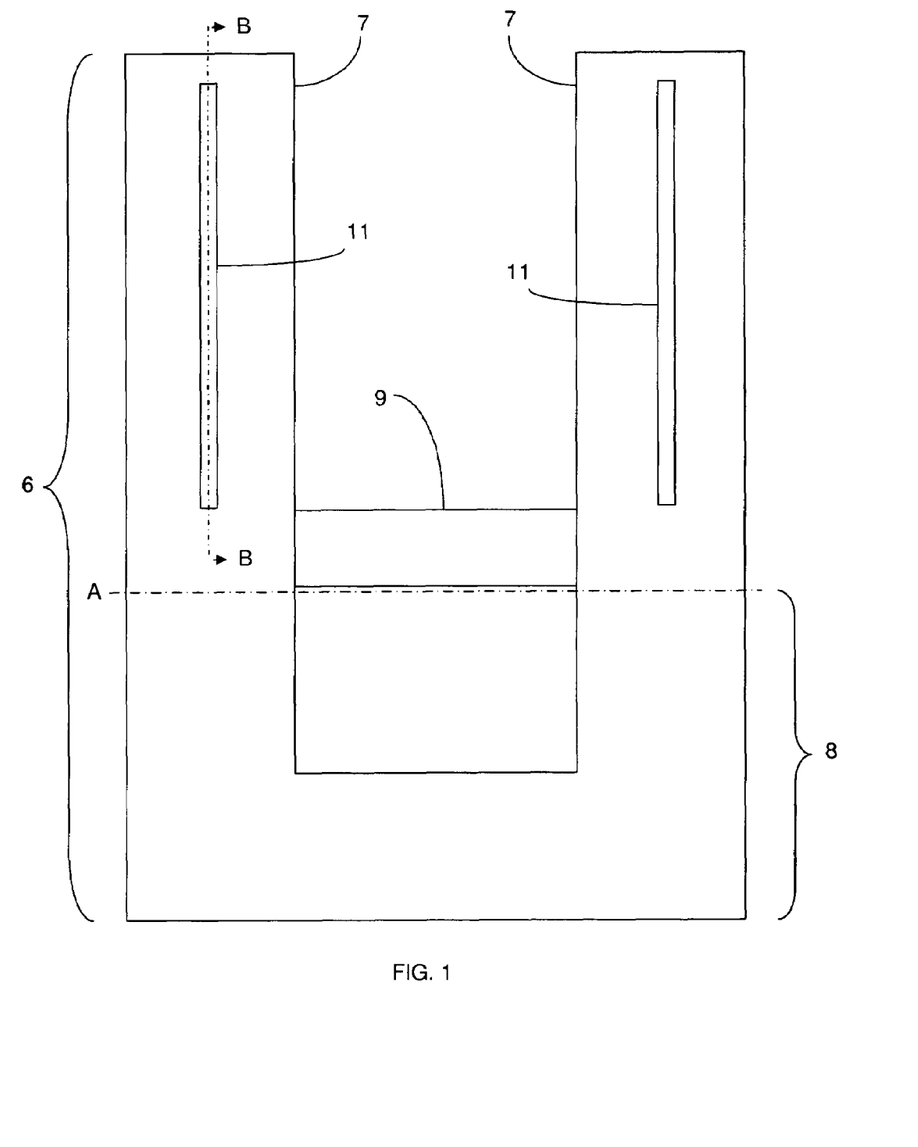
FIG. 1 is a rear view of the frame laid flat.
Figure 2A:
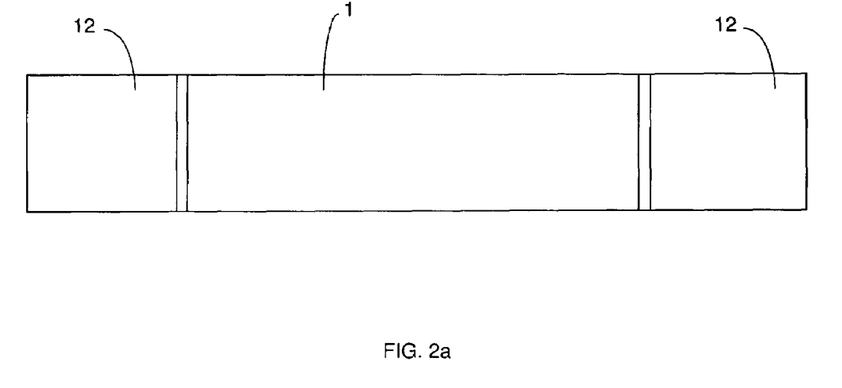
FIG. 2a is a front view of the shoulder roll and backing.
Figure 2B:
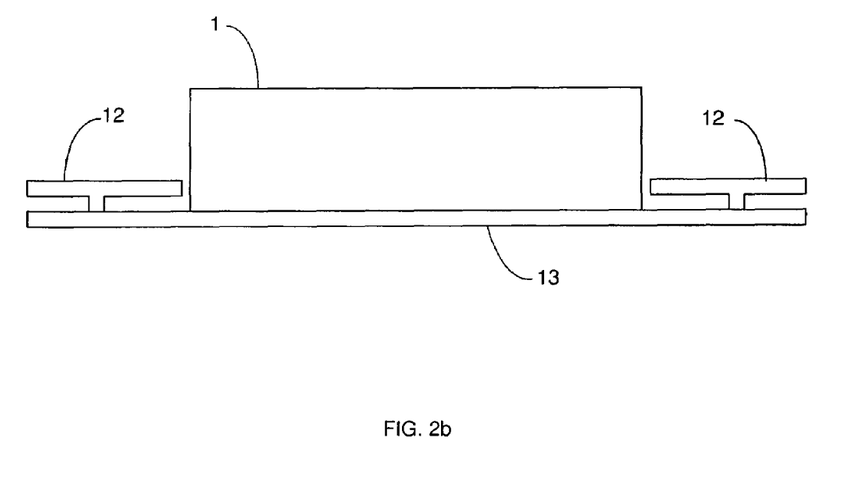
FIG. 2b is a top view of the shoulder roll and backing.
Figure 3A:
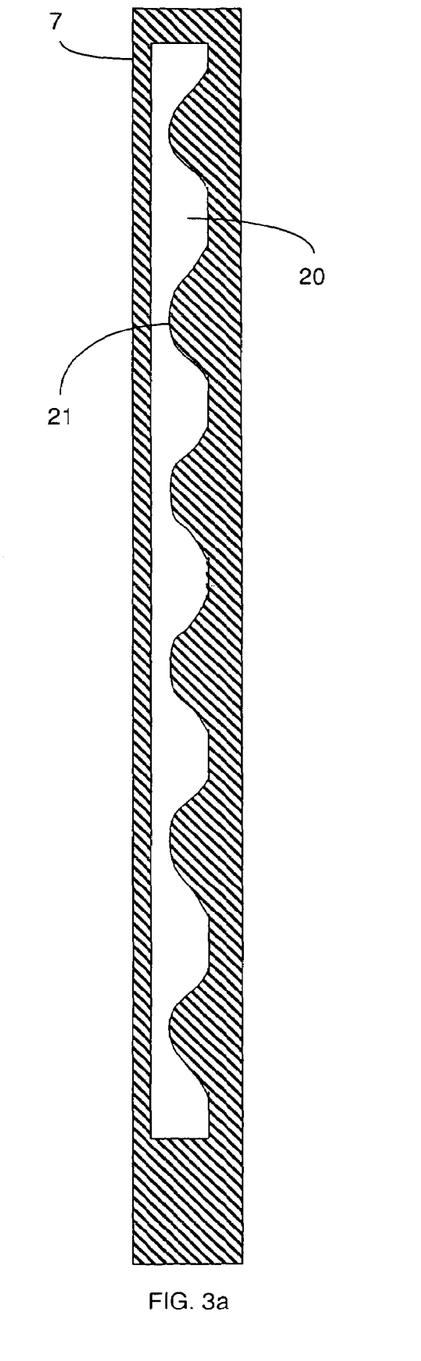
FIG. 3a is a section view of the preferred embodiment of a column, taken along line B-B in FIG. 1.
Figure 3B:
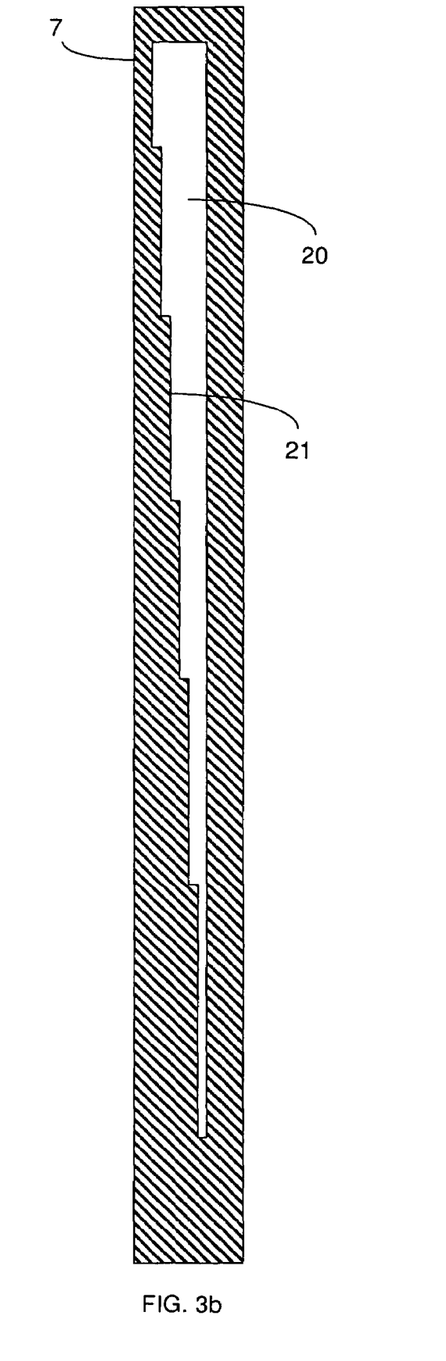
FIG. 3b is a section view of an alternate embodiment of a column, taken along line B-B in FIG. 1.
Figure 4:
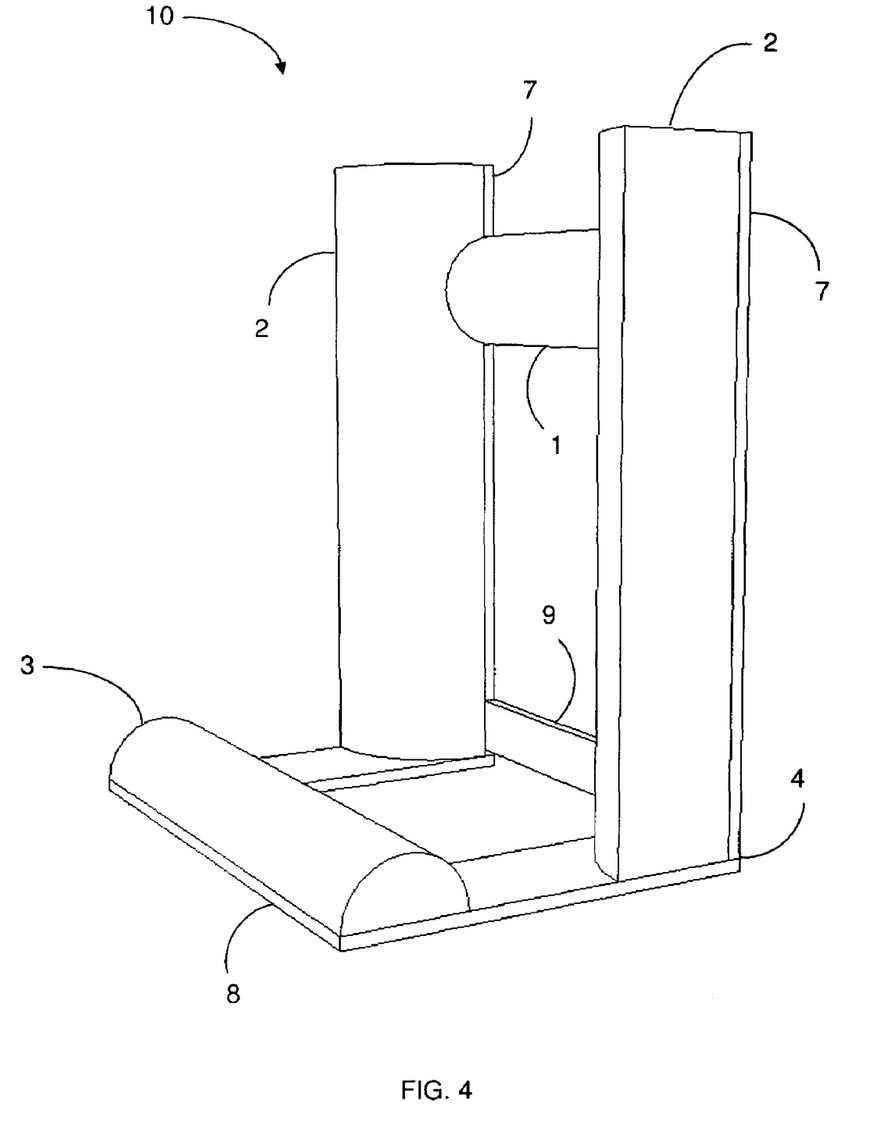
FIG. 4 is a perspective view of the preferred embodiment of the insert showing the front and right sides.
Figure 5:
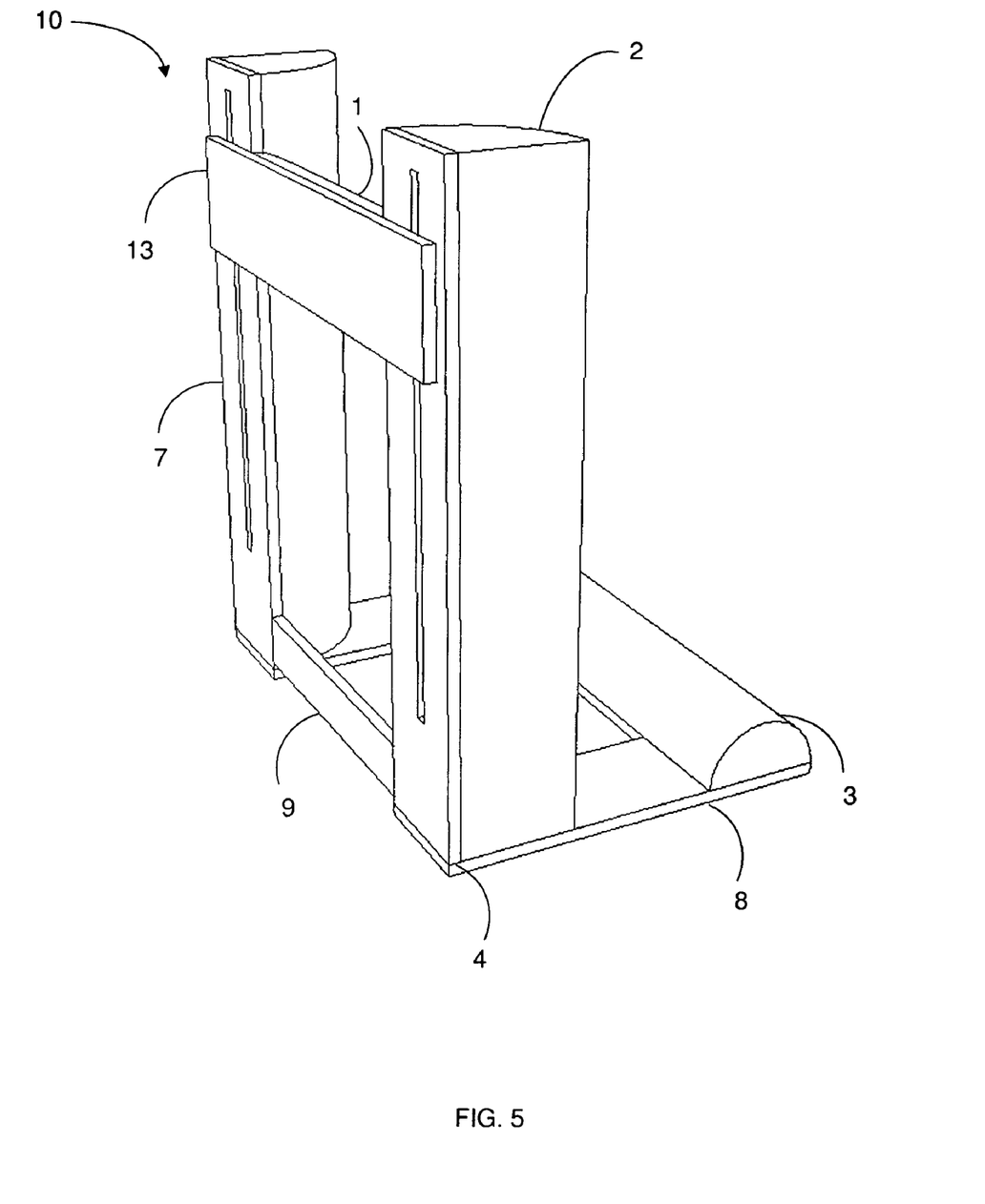
FIG. 5 is a perspective view of the preferred embodiment of the insert showing the back and left sides.
Figure 6:
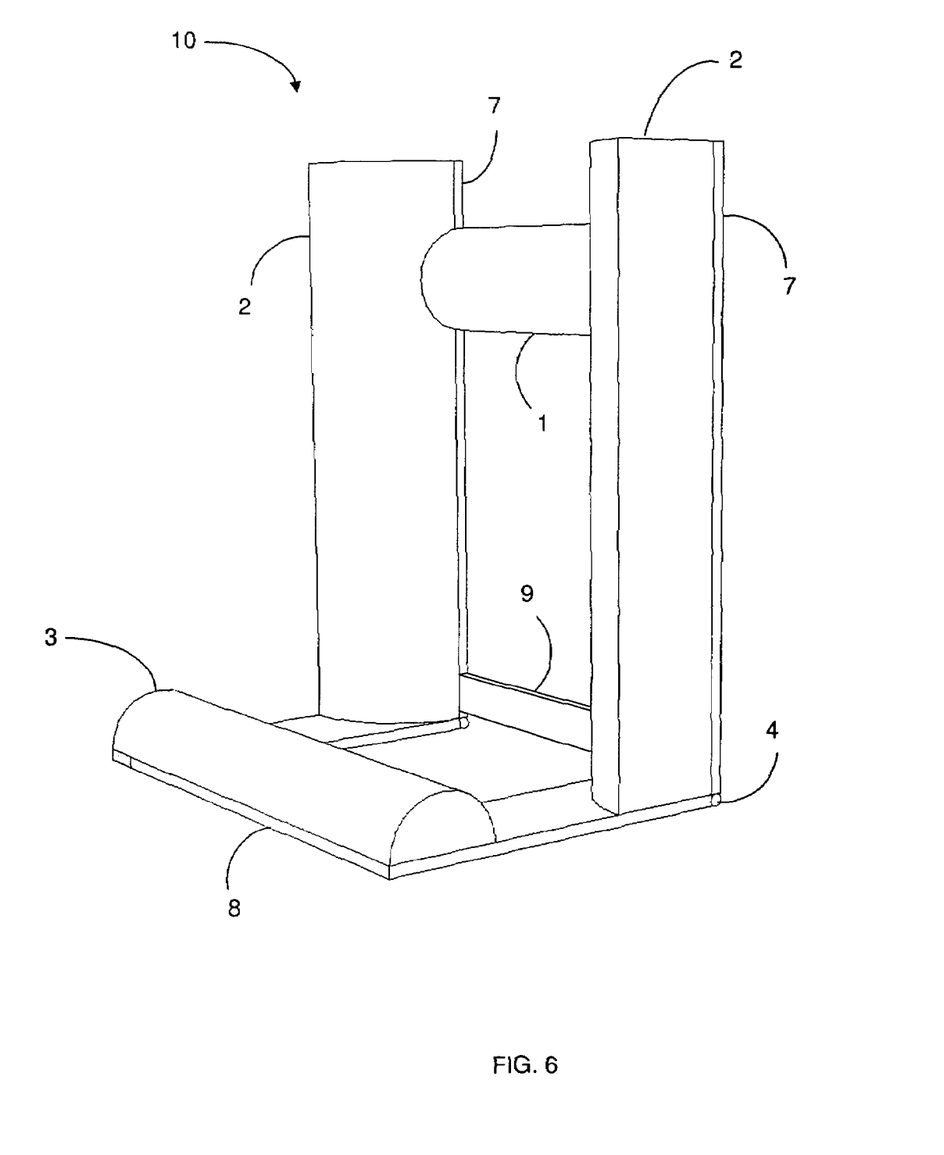
FIG. 6 is a perspective view of an alternate embodiment of the insert showing the front and right sides.
Figure 7:
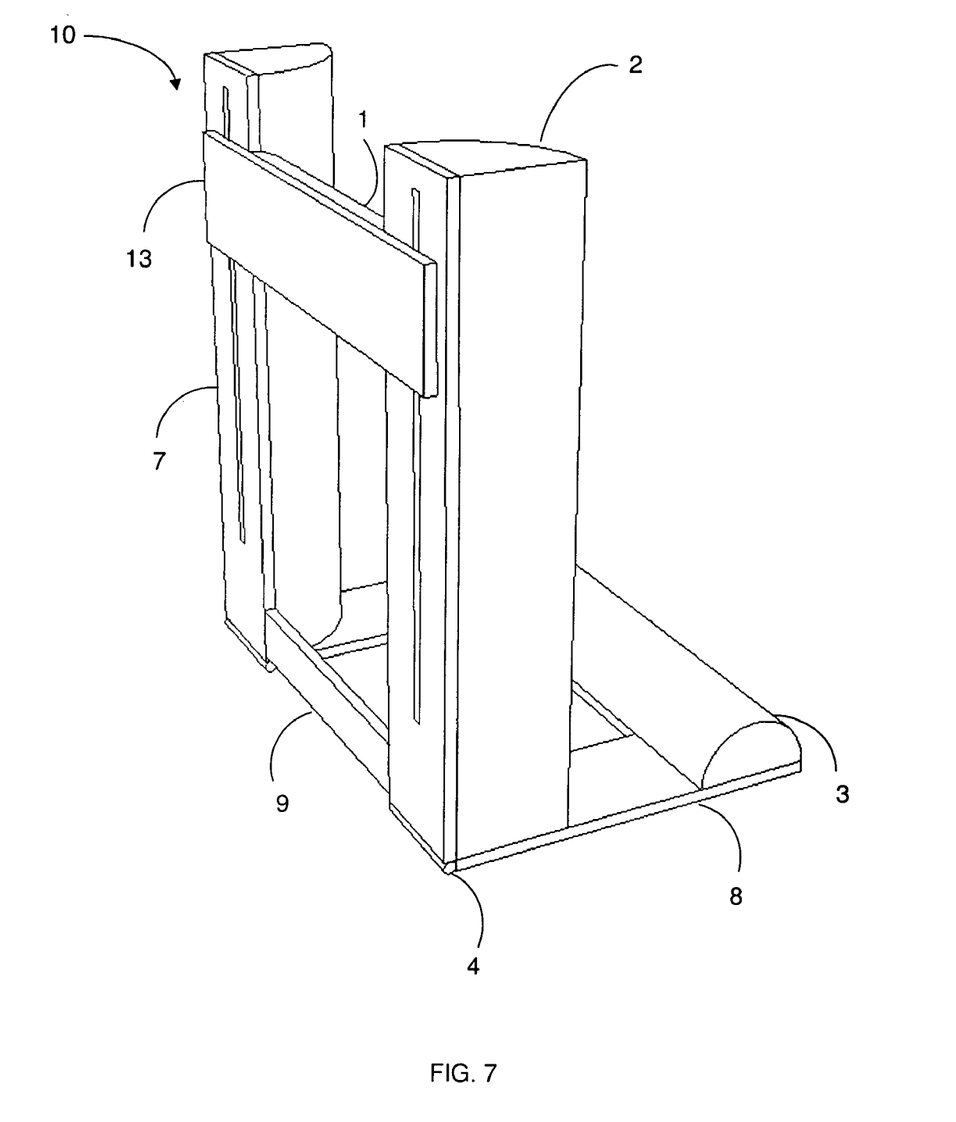
FIG. 7 is a perspective view of an alternate embodiment of the insert showing the back and left sides.

FIGS. 1-7 illustrate the present invention, designated generally as 10, which is used to position an infant in an infant seat where excess space in the infant seat poses the danger of compromising the infant's breathing airway. Referring to FIG. 1, a frame 6 is U-shaped and forms the core of the insert 10. The frame 6 may be any non-toxic and inexpensive material, such as rubber, medium-density fibreboard, cardboard, vinyl, polyvinyl chloride, or other polymers. The frame 6 may be rigid or flexible, but is preferably flexible to best conform to the surface on which it is placed. Preferably, the frame 6 is a single, planar piece made of rubber, which comprises two columns 7 and a base 8. The frame 6 may be sufficiently flexible that a natural bend occurs where the columns 7 meet the base 8, shown by line A in FIG. 1, allowing the insert 10 to lay flat or to bend to conform to the incline angle of any seat. When flat, the columns 7 and base 8 are substantially coplanar. When inclined, the columns 7 may be adjusted independently of each other, but once positioned in the infant seat the columns 7 are preferably substantially coplanar. The columns 7 and base 8 are attached to each other, wherein throughout this application attached means operably connected to each other, either integrally or in pieces, either permanently or removeably. The columns 7 and base 8 may also be physically separable at line A and permanently or removably rejoined by an attachment structure 4. Preferably, the attachment structure 4 is Velcro®, allowing the base 8 to be easily removed from the columns 7. In an alternate embodiment, shown in FIGS. 6 and 7, the attachment structure 4 is a set of hinges. Alternatively, if a flat-laying insert 10 is not desired, the frame 6 may be initially shaped in a rigid incline shape for placement in specific infant seats. For example, the frame 6 may be cast so the columns 7 and base 8 are defined by a 90 degree angle integral with the frame 6, so the insert 10 may be used in a straight-backed high chair.

A bottom roll 3 is attached to the base 8. The bottom roll 3 may be any shape that will support the infant, but is preferably a half cylinder. Preferably, the bottom roll 3 and base 8 are removably attached to the columns 7 so the insert 10 can be used for infants who do not need the support provided by the bottom roll 3. At least one side roll 2 is attached to each column 7. Preferably, a single side roll 2 is attached to each column and is the same width as the column 7 and is parallel to the column 7. Each side roll is preferably straight for ease of manufacturing, but may also be curved to resemble the contours of the infant's body. Alternatively, multiple side rolls 2 may be attached to the column 7 and may be varying widths to approximate the contours of the infant's body. For example, the side rolls 2 at the tops of the columns 7 may be wide enough to contact the sides of the infant's head. The side rolls 2 may be any shape that will support the infant, but preferably form one-quarter of a cylinder so that the surfaces of the side rolls 2 which contact the infant seat may best conform to the interior corners of the infant seat. The side rolls 2 and bottom roll 3 comprise a filler material such as cotton fill, memory foam, polyester fill, down fill, open- or closed-cell foam, or other materials that are preferably non-toxic and comfortable. Preferably, the side rolls 2 and bottom roll 3 are memory foam. The side rolls 2 and bottom roll 3 also comprise a fabric cover which encases the filler material and also stretches around the frame 6, attaching the side rolls 2 and bottom roll 3 to the frame 6. Alternatively, the fabric cover may encase the filler material and then be attached to the frame 6 by an adhesive, such as glue, or a nonadhesive, such as staples, buttons, or hook-and-loop attachments such as Velcro®. The fabric cover may be any non-toxic and comfortable material, such as cotton, polyester, denim, velour, or a blend of materials. The fabric is preferably polyester. The fabric is preferably machine-washable but may also be dry-clean only.

A shoulder roll 1 is oriented perpendicularly to the columns 7, stretching between the side rolls 2. The shoulder roll 1 may be any shape that will support the infant, but is preferably a half cylinder. The shoulder roll 1 is preferably straight, but may be arched or rounded to support the infant's neck as well as its shoulders. The shoulder roll 1 preferably comprises the same material as the side and back rolls 2 and 3. The shoulder roll 1 is attached to its own backing 13 which is separate from the frame 6 but is preferably made of the same material as the frame 6. The backing 13 attaches to the frame 6 via two guides 11 on the back of the columns 7. See FIG. 2b. The attachment between the backing 13 and the guides 11 allows the shoulder roll 1 to glide up and down the columns 7 so that the shoulder roll 1 may be properly positioned behind the infant's shoulders. The guides 11 may be inset into the columns 7 or may extend outward from the columns 7, and may be integral with the columns 7 or may be separate pieces adhered to the columns 7. In the preferred embodiment, the backing 13 comprises two anchors 12 and the guides 11 are slots integrated into the columns 7. See FIGS. 2a and 2b. The slots allow access to the interior of each column 7, which is at least partially hollow to create a cavity 20 large enough to accept an anchor 12 inserted through the slot 11. The backing 13 is thereby anchored to the columns 7. In the preferred embodiment, the interior of the column 7 includes a series of elevations 21 which protrude into the cavity 20 to impede the gliding motion of the backing 13. In the preferred embodiment, shown in FIG. 3a, the elevations 21 are spaced at regular intervals and protrude into the cavity 21, narrowing the cavity 21 to a point that the anchors 12 cannot move past an elevation 21 unless a pushing or pulling force is applied to the shoulder roll 1. The elevations 21 may be rounded, rectangular, triangular, or other shapes, but are preferably rounded. In an alternate embodiment, shown in FIG. 3b, the elevations 21 protrude into the cavity 20 in a stepping configuration. The backing 13 glides up or down until the anchors 12 meet an elevation 21. To move the backing 13 further down the columns 7, a user pulls the backing 13 forward to release the anchors 12 from the current elevation 21, then slides the backing 13 downward.

A support bar 9 may be included to improve the integrity of the insert 10 once it is placed in the infant seat. The support bar 9 attaches to each column 7 near line A, extending between the columns. The support bar 9 is rigid in order to stabilize the columns 7 in the infant seat by keeping the columns 7 a set distance apart and preventing their bending or shifting into odd angles. The support bar 9 is preferably plastic, but may also be the same material as the frame 6. The support bar 9 is preferably covered in fabric like the rolls.

Figure 8:
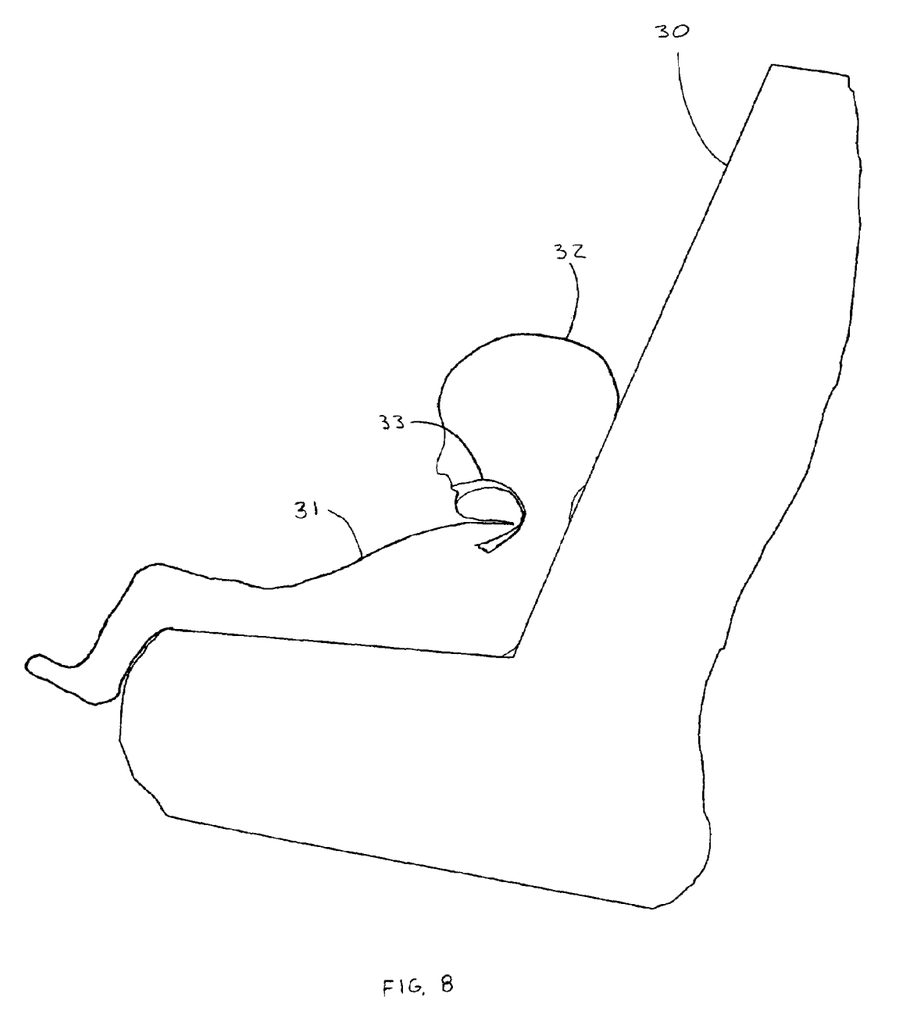
FIG. 8 is a right-side view of a small infant in a car seat without the insert.
Figure 9:
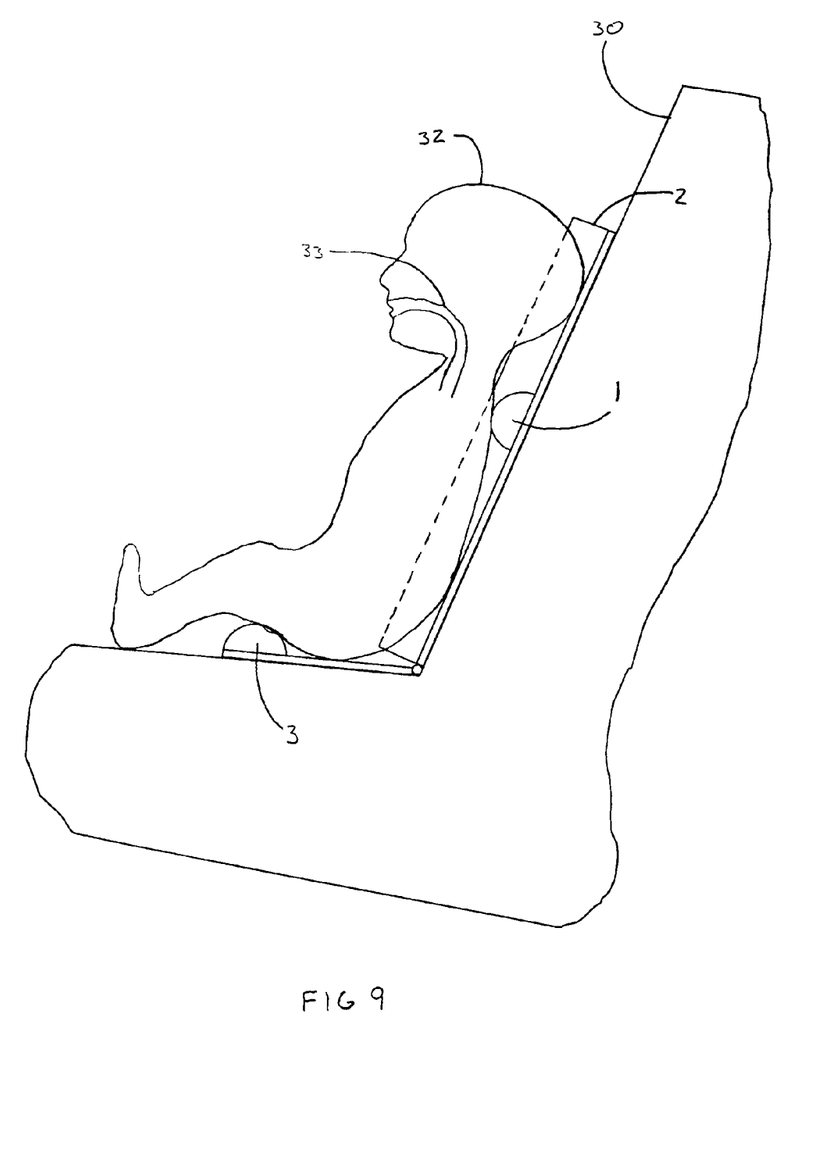
FIG. 9 is a right-side view of a small infant in a car seat with the insert.

Referring to FIG. 8, without the insert 10 in place in the infant seat 30, the infant 31 slouches and the back of the head 32 rests against the back of the infant seat 30, pushing the head 32 forward and restricting the airway 33. When the insert 10 is placed in the infant seat, the columns 7 and base 8 may be adjusted to conform to the incline angle of the infant seat. See FIG. 9. The insert 10 may be held in place by the weight of the infant, by restraints built into the infant seat, or by an additional attachment mechanism such as a series of buttons that mate with buttons on the infant seat. The bottom roll 3 is positioned under the infant's 31 buttocks or upper legs to prevent the infant 31 from slouching in the infant seat 30. The infant's 31 upper body rests against the side rolls 2. The infant 31 is thus prevented from shifting to the left or right. The shoulder roll 1 is positioned behind the infant's 31 shoulders so that a natural position of the head 32 is maintained and the airway 33 remains clear. The insert 10 may also be laid flat, such as on a changing table, and the infant placed thereon with the shoulder roll positioned behind the infant's shoulders. The shoulder roll keeps the infant's head in a natural position and protects the airway, while the side rolls prevent the infant from rolling off the table.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. A device for positioning an infant, the device comprising:
   a frame of a positioning insert for the infant including a first column and a second column, wherein the first and second columns are positioned vertically;
   a first guide integrated into the first column and a second integrated into the second column, wherein the first and second guides are slots providing access to a cavity in each column and the slots extend substantially along the entire length of each column;
   a first side roll attached to the first column so that the first side roll and the first column make a partial cylindrical shape and a second side roll attached to the second column so that the second side roll and the second column make a partial cylindrical shape; and
   a shoulder roll of the positioning insert attached to the frame via the first column and the second column, wherein the shoulder roll is perpendicular to the first column and the second column, wherein the shoulder roll further comprises a backing that attaches to the first guide using a first anchor and to the second guide using a second anchor such that the backing can move along the first and second guides.

2. The device of claim 1 further comprising a bottom roll attached to the frame such that the bottom roll can be positioned beneath the buttocks or upper legs of the infant.

3. The device of claim 1 wherein the frame comprises:
the second column substantially coplanar with the first column and spaced apart from the first column to allow the infant to be placed between the first and second columns;
further comprising a support bar attached to the first and second columns such that the support bar keeps the first and second columns a set distance apart.

4. The device of claim 1 further comprising at least one of the first side roll, the second side roll, or a bottom roll attached to the frame in which in at least one of the first side roll, second side roll, bottom roll, or shoulder roll further comprises a cover containing fill.

5. The device of claim 4 wherein the cover is attached to the frame by stretching it over the frame.

6. The device of claim 4 wherein the cover is attached to the frame by an adhesive.

7. The device of claim 4 wherein the cover is attached to the frame by a non-adhesive.

8. The device of claim 4 wherein at least one of the cover is polyester and the fill is memory foam.

9. The device of claim 1 wherein the frame comprises:
a) a base;
b) the first column attached to the base; and
c) the second column attached to the base;
the columns being substantially coplanar and spaced apart to allow the infant to be placed between them.

10. The device of claim 9 wherein the first and second columns are attached to the base using an attachment structure that enables an angle between the columns and the base to be changed to conform to the incline angle of an infant seat.

11. The device of claim 9 wherein the shoulder roll is adjustably attached to the frame at the first column and the second column such that the shoulder roll may be positioned behind the infant's shoulders by moving it along the first and second columns.

12. The device of claim 9 wherein the shoulder roll may be positioned behind the infant's shoulders by moving the backing along the first and second guides.

13. An insert for positioning an infant, the insert comprising:
a) a base of a positioning insert for the infant;
b) a first column attached to the base;
c) a second column attached to the base, wherein the base extends forwardly of the first column and the second column;
d) a first side roll attached to the first column;
e) a second side roll attached to the second column;
f) a first guide in the first column;
g) a second guide in the second column, wherein the first and second guides are slots providing access to a cavity in each column;
h) a shoulder roll attached to the first and second columns such that it can be moved up and down the columns along the first and second guides and wherein the shoulder roll is perpendicular to the first and second columns and the shoulder roll is attached to a backing that is attached to the first and second guides by a first anchor and a second anchor, respectively; and
i) a bottom roll attached to the forward portion of the base.

14. The insert of claim 13 further comprising a support bar attached to the first column and the second column such that the support bar keeps the first and second columns a set distance apart.

15. The insert of claim 13 wherein the insert can be placed in a first position in which the base and columns are substantially co-planar and a second position in which the base and columns conform to the incline angle of an infant seat.

16. The device of claim 13 wherein the first side roll is a quarter cylinder.

17. The device of claim 13 wherein the shoulder roll is a half cylinder.

18. A method, comprising the steps of:
configuring a frame of a positioning insert for an infant to include a first column and a second column;
positioning the first and second columns vertically;
integrating a first guide into the first column and a second guide into the second column, wherein the first and second guides are slots providing access to a cavity in each column and the slots extend substantially along the entire length each column;
attaching a first side roll to the first column so that the first side roll and the first column make a partial cylindrical shape and attaching a second side roll to the second column so that the second side roll and the second column make a cylindrical shape;
positioning a shoulder roll of the positioning insert onto the frame via the first and second columns;
positioning the shoulder roll onto the frame perpendicular to the first column and the second column,
wherein if the infant is positioned onto the positioning insert then the breathing airway of the infant is not substantially compromised; and
attaching a backing of the shoulder roll to the first guide using a first anchor and to the second guide using a second anchor such that the backing can move along the first and second guides.

* * * * *